United States Patent
Rodriguez-Sanchez et al.

(10) Patent No.: US 7,230,922 B1
(45) Date of Patent: Jun. 12, 2007

(54) REAL-TIME RATE CONTROL MECHANISM FOR MULTI-RATE DATA TRANSMISSIONS IN WIRELESS NETWORKS

(75) Inventors: Jose Rodriguez-Sanchez, Seattle, WA (US); Derek Hilborn, Seattle, WA (US); Eamonn Gormley, Seattle, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 1025 days.

(21) Appl. No.: 10/116,160

(22) Filed: Apr. 5, 2002

(51) Int. Cl.
*H04J 3/16* (2006.01)

(52) U.S. Cl. ............ 370/232; 370/329; 370/332; 370/468

(58) Field of Classification Search ............ 370/232, 370/230, 329, 342, 220, 352; 455/67.14
See application file for complete search history.

(56) References Cited

U.S. PATENT DOCUMENTS

| | | | |
|---|---|---|---|
| 5,483,676 A * | 1/1996 | Mahany et al. | 455/67.14 |
| 5,912,921 A * | 6/1999 | Warren et al. | 375/220 |
| 6,141,353 A | 10/2000 | Li | |
| 6,229,795 B1 * | 5/2001 | Pankaj et al. | 370/329 |
| 6,292,476 B1 | 9/2001 | Zehavi et al. | |
| 6,393,012 B1 * | 5/2002 | Pankaj | 370/342 |
| 6,836,480 B2 * | 12/2004 | Basso et al. | 370/390 |
| 2001/0006508 A1 * | 7/2001 | Pankaj et al. | 370/232 |

FOREIGN PATENT DOCUMENTS

WO    WO01/11828    2/2001

OTHER PUBLICATIONS

Sano T., et al.: Monitoring-based flow control for reliable multicast protocols and its evaluation, Performance, Computing and Communications Conference, 1997, IEEE International Phoenix, Tempe, AZ, USA, Feb. 5-7, 1997, New York, NY, USA, IEEE, US, Feb. 5, 1997, pp. 403-409.

* cited by examiner

*Primary Examiner*—Chau Nguyen
*Assistant Examiner*—Albert T. Chou
(74) *Attorney, Agent, or Firm*—Kenyon & Kenyon LLP

(57) ABSTRACT

Wireless networks are becoming increasingly heterogeneous in terms of the processing capabilities of network users' receiving equipment. According to embodiments of the invention, in a communications network comprising a plurality of receivers with different data reception rate capabilities, data frames targeted to respective receivers may be transmitted to the receivers in accordance with the respective data reception rate capabilities of the receivers.

16 Claims, 4 Drawing Sheets

US 7,230,922 B1

REAL-TIME RATE CONTROL MECHANISM FOR MULTI-RATE DATA TRANSMISSIONS IN WIRELESS NETWORKS

TECHNICAL FIELD

The present invention relates to data transmission in a communications network, and more particularly to a method and system for data transmission in a network wherein receivers of the network have different data reception rate capabilities.

BACKGROUND OF THE INVENTION

Multi-rate capabilities are increasingly becoming a necessity for wireless data networks. For example, to be competitive and allow a flexible sales strategy, network service providers may need to be able to offer customers different data rates at different prices.

Additionally, as technology advances, manufacturers and service providers are able to offer customers new generations of improved receiving equipment at regular intervals. This leads to a situation wherein some network users may have the newest equipment with the highest data reception rate capabilities, while others who may be unwilling to undertake the cost of an upgrade may have older equipment with lower data reception rate capabilities.

More generally, for various reasons, wireless networks of the future will tend to become increasingly heterogeneous in terms of the processing capabilities of users' receiving equipment.

Known data transmission methods in wireless networks either do not allow for a disparity in data reception rate capabilities among users, or typically do not efficiently handle such a disparity if it does exist. Rather, such data transmission methods may waste bandwidth in that data transmission rates must accommodate the user with the slowest equipment.

In view of the foregoing, a method and system are needed for efficiently handling data transmission in a wireless network wherein network users have different data reception rate capabilities.

SUMMARY OF THE INVENTION

According to embodiments of the present invention, in a communications network comprising a plurality of receivers with different data reception rate capabilities, data frames targeted to respective receivers may be transmitted to the receivers in accordance with the respective data reception rate capabilities of the receivers.

In one embodiment, a queue of data frames targeted to respective receivers may be maintained, and a data frame may be selected from the queue to transmit, based on the data reception rate capability of the target receiver of the selected data frame. To select the data frame, a data reception rate capability of the target receiver of the queued frame may be identified. If the data reception rate capability of the target receiver is not exceeded by transmitting the queued data frame in a next consecutive channel resource slot, the queued data frame may be transmitted to the target receiver. Otherwise, the queue may be searched for a data frame which can be transmitted in the next consecutive channel resource slot without exceeding the data reception rate capability of its target receiver.

DETAILED DESCRIPTION

Figure 1:
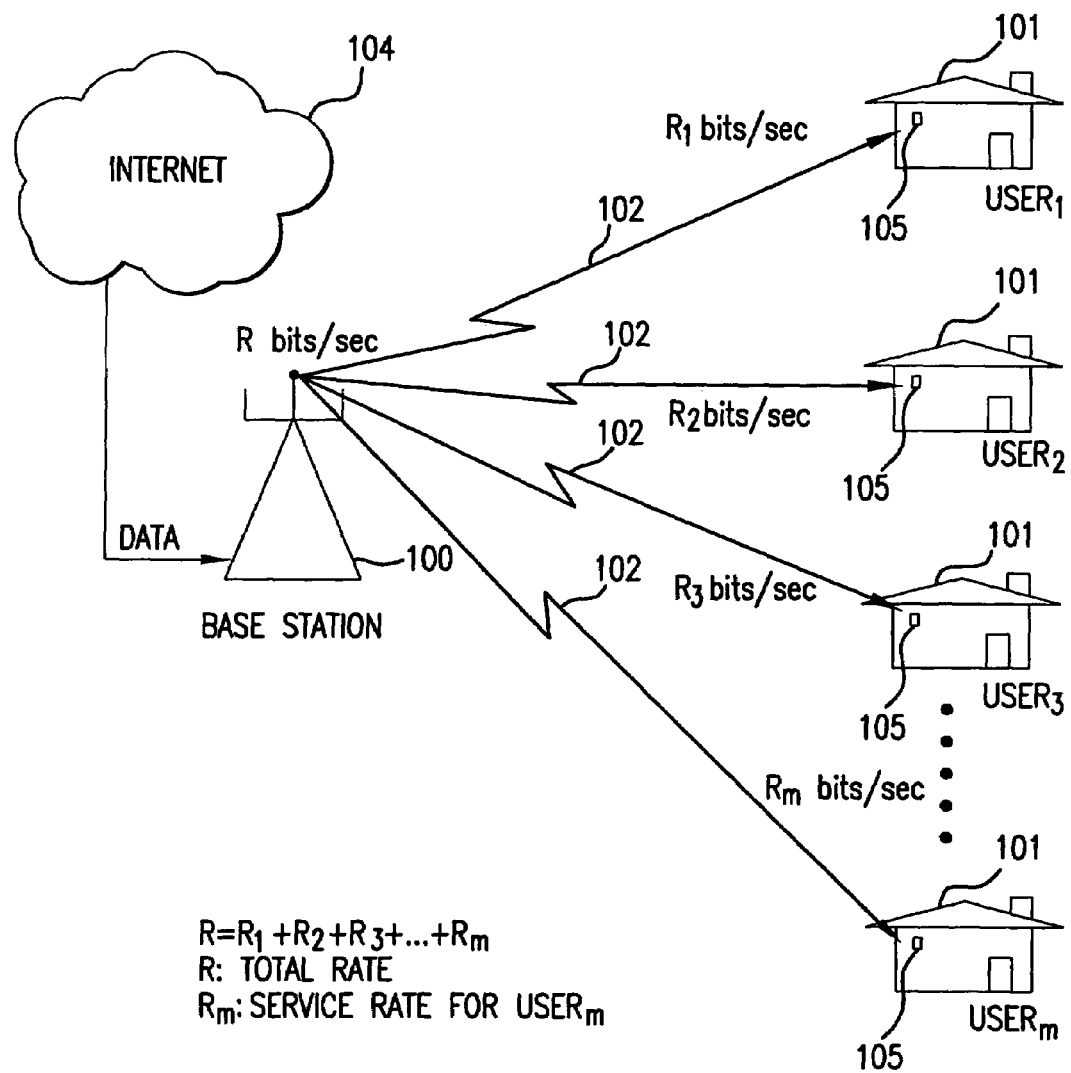
FIG. 1 shows an example of a wireless network configuration wherein users have different data reception rate capabilities.

According to embodiments of the invention, a rate controller for efficiently controlling the transmission of data to network users with different data reception rate capabilities may be embodied in a base station of a wireless communications network. FIG. 1 shows one possible configuration of such a wireless communications network. In FIG. 1, a plurality m of network users 101 may receive wireless transmissions 102 from a base station 100 of a wireless network. The users 101 are in fixed locations such as private residences or business offices in the example of FIG. 1, but it should be understood that the invention is not limited to fixed users, but could also include mobile users.

Users 1 through m may, for example, download information from an information source such as the Internet 104. The information will typically be in the form of data "frames" (also called "packets"), each formatted with a header for routing the data frame in a point-to-point fashion, according to some data protocol such as TCP/IP (Transmission Control Protocol/Internet Protocol), through the network to a target user. The downloaded information may, for example, be transmitted via a wired or wireless link to base station 100.

Each user 1–m may have a different data reception rate capability. More specifically, each user may have receiving equipment (referred to herein as a "receiver") with a different data reception rate capability than the receivers of the other users. A typical receiver 105 may be embodied as a modular unit which may be installed externally to a residence or office. A typical receiver may include a processor or processors and a receiving antenna. In known receivers, depending on such factors as processing speed, data reception rate capabilities may vary, for example, between 512 bits/sec and 2.5 Mbits/sec.

In the example of FIG. 1, base station 100 (or more particularly, a transmitter thereof) has a transmission bandwidth of R bits/sec. Thus, to service m receivers 105 with data reception rate capabilities of $R_1, R_2, R_3, \ldots R_m$ bits/sec, respectively, wherein, for example, $R_1 < R_2 < R_3 \ldots < R_m$, R may be equal to $R_1 + R_2 + R_3 + \ldots + R_m$. It should of course be understood that not all receivers of a given network according to embodiments of the invention need have distinct data reception rate capabilities; more generally, some receivers of the network may have the same data reception rate capability.

It should be further understood that "data reception rate capability" as used herein refers not only to limitations of receiver technology such as processing speed, but also to limitations on a transmitted data rate which may be arbitrarily imposed, for example according to a pricing agreement with a user.

Figure 2:
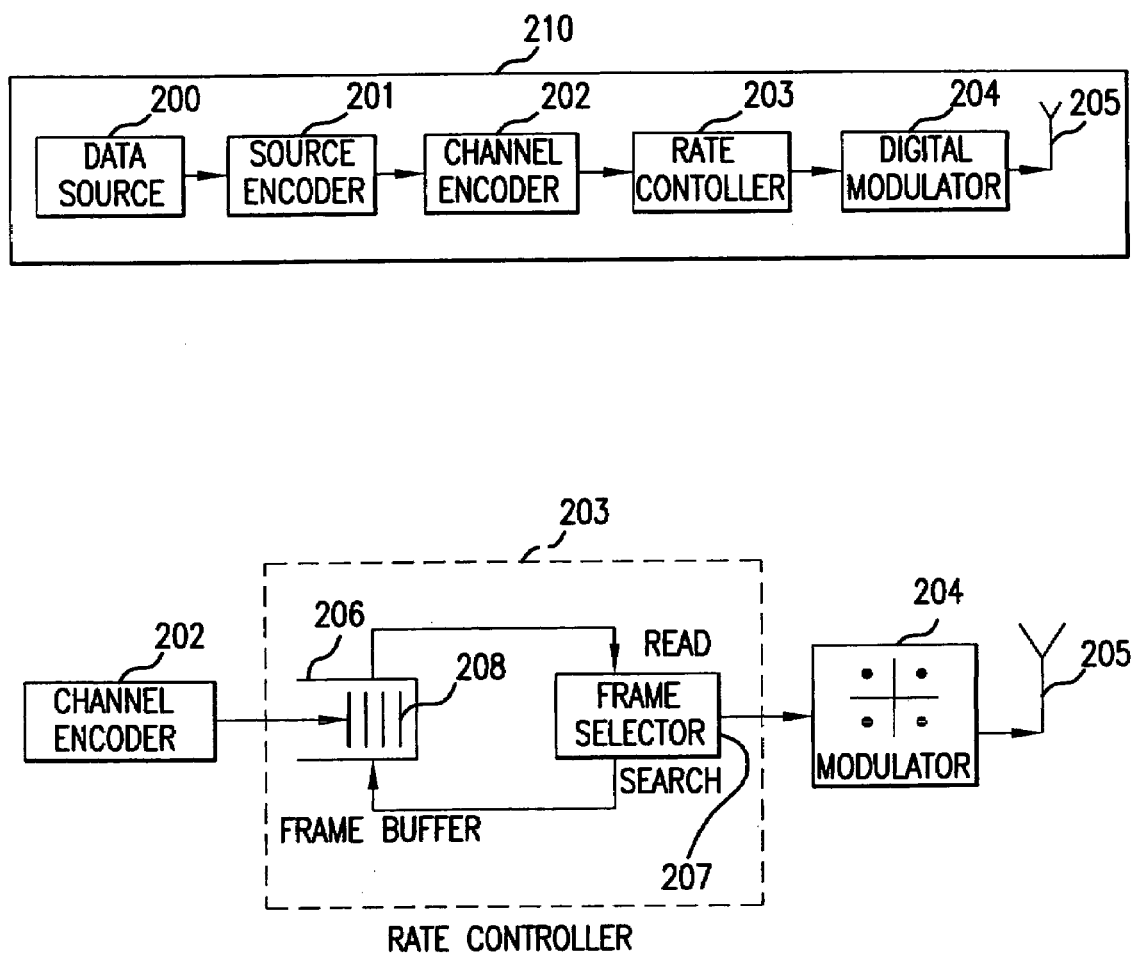
FIG. 2 is a block diagram showing embodiments of a base station and a rate controller according to the invention.

FIG. 2 shows more detail of elements of a transmitter 210 of base station 100 according to embodiments of the invention. The source encoder 201, channel encoder 202, digital modulator 204 and transmitter 205 are conventional and will not be discussed herein in significant detail. Briefly, a localized data source 200 may provide data to source encoder 201 of base station 100. Source encoder 201 may process the data from data source 200 to map source symbols in the data to an intermediate alphabet, typically a set of binary strings, and pass the processed data to channel encoder 202. Channel encoder 202 may map the data received from source encoder 201 into a set of coded bits or waveforms for transmission over a channel, performing such operations as adding error-checking and parity bits to the data. A rate controller 203 according to the invention may then process the data as described in greater detail below. The rate-controlled data generated by rate controller 203 may then be input to digital modulator 204, which may modulate the data according to some digital modulation scheme such as QAM (quadrature amplitude modulation). The modulated data may then be transmitted via a wireless channel by an antenna 205 to a plurality of receivers 105.

Transmitter 210 of base station 100 may comprise computational resources such as computer processors, memory, storage media such as disks, and software for processing data as described above. These computational resources and associated channel bandwidth are collectively referred to herein as "transmitter resources." Because the channel bandwidth may be used to transmit data to a plurality of users, the transmitter resources may be committed to some multiplexing scheme. In such a multiplexing scheme, the available bandwidth of the channel may be partitioned into "channel resource slots." These channel resource slots may be time slots, frequency slots or frequency-time slots. As is well understood in time division multiplexing (TDM), for example, available channel resources are partitioned into time slots, wherein individual time slices of bandwidth are allocated to different users. Other multiplexing schemes which may be used according to embodiments of the invention include frequency division multiplexing and frequency-time division multiplexing.

As noted earlier, a plurality of users 101 may download information from Internet 104 or some other data source, resulting in a plurality of data frames targeted for a plurality of receivers 105 being sent to transmitter 210 of base station 100. After being processed by source encoder 201 and channel encoder 202 as described above, the data frames targeted to respective receivers may be processed by rate controller 203 according to embodiments of the invention. It should be understood that typical digital communication systems are not multi-rate, and therefore lack rate controller 203 as shown. Rate controller 203 may comprise a frame buffer 206 wherein a queue 208 of the targeted data frames received from the channel encoder is maintained. Rate controller 203 may further comprise a frame selector 207.

As discussed above, transmitter 210 of base station 100 may comprise computer processors, memory, storage and software for implementing its functions. In particular, frame selector 207 may be implemented in computer-executable instructions, and frame buffer 206 containing queue 208 may be maintained in a memory of the transmitter. Frame buffer 206 could be formatted, for example, as an array, or as a linked list.

Frame selector 207 may be configured to select a data frame from queue 208 to transmit, based on the data reception rate capability of the target receiver of the selected data frame. To select the data frame, a data reception rate capability of the target receiver of the queued frame may be identified. If the data reception rate capability of the target receiver is not exceeded by transmitting the queued data frame in a next consecutive channel resource slot, the queued data frame may be transmitted to the target receiver. Otherwise, the queue may be searched for a data frame which can be transmitted in the next consecutive channel resource slot without exceeding the data reception rate capability of its target receiver.

Figure 3A:
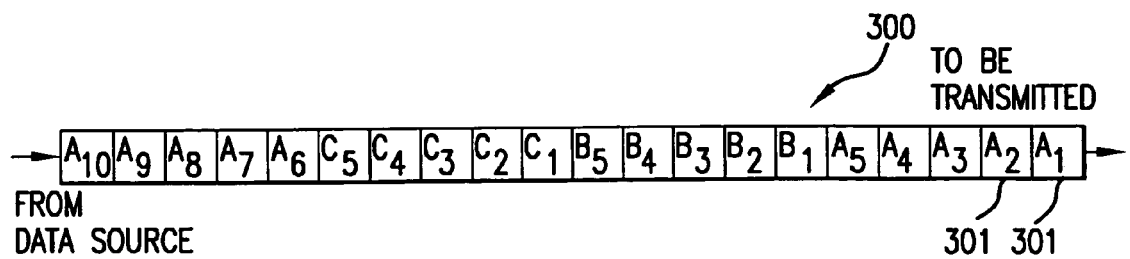
FIGS. 3A–3C show an example of rate control according to an embodiment of the invention.
Figure 3B:
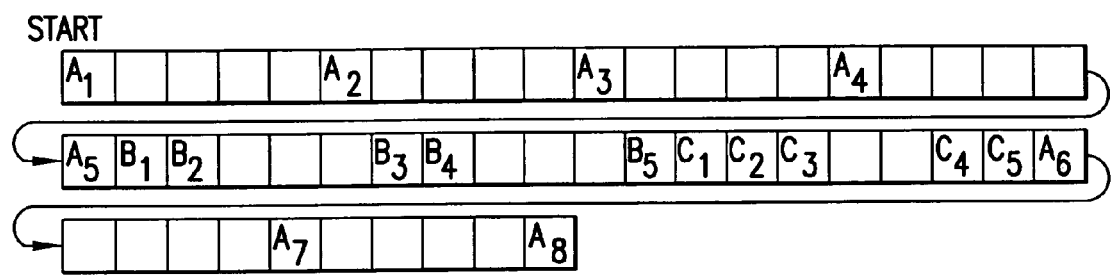
Figure 3C:
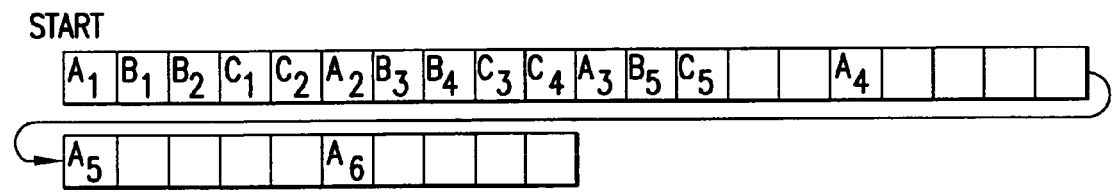

FIGS. 3A–3C illustrate an example of the foregoing. For ease of understanding, an example wherein the channel resource slots are time slots is discussed. However, it should be understood that the channel resource slots could alternatively be frequency slots or frequency-time slots.

In FIG. 3A, a sequence 300 of data frames 301 is shown. "A", "B" and "C" indicate respective target receivers of the data frames; i.e., a receiver A is the destination of frames $A_1$–$A_{10}$, a receiver B is the destination of frames $B_1$–$B_5$, and a receiver C is the destination of frames $C_1$–$C_5$. Subscripts denote the sequence in which the frames should be transmitted to their respective receivers.

Typically, the frames would arrive at base station 100 in "bursts," as shown: i.e. in groupings of consecutive frames targeted to one receiver. In the example of FIG. 3A, each burst is five frames long; two bursts are directed to receiver A, and one burst each is directed to receivers B and C.

In this example, assume that base station 100 can transmit data at a maximum rate of 1 frame per second. Also, assume that each second corresponds to a time slot of the channel resource slots. Further, assume that receiver A has a data reception rate capability of 1 frame per 5 seconds, receiver B has a data reception rate capability of 2 frames per 5 seconds, and receiver C has a data reception rate capability of 3 frames per 5 seconds.

FIG. 3B shows how the frames might be transmitted to their respective target receivers in the absence of rate control according to the invention. The "oldest" frames, i.e., the frames which have been queued the longest, should be transmitted first. Thus, frames $A_1$–$A_5$ are to be transmitted first. However, because receiver A has a data reception rate capability of only 1 frame per 5 seconds, base station 100 must wait four seconds after transmitting frame $A_1$ before it can transmit frame $A_2$, since otherwise, the data reception rate capability of receiver A would be exceeded. Thus, four time slots of the channel resource slots are wasted. Similarly, four time slots are wasted between the transmitting of each of $A_3$, $A_4$ and $A_5$.

When it is the turn of frames B1–B5 to be transmitted to receiver B, two frames can be sent in consecutive time slots as shown. However, because the data reception rate capability of receiver B is only 2 frames per 5 seconds, three time slots are wasted between the transmitting of $B_2$ and $B_3$, and $B_4$ and $B_5$.

Because the data reception rate capability of receiver C is 3 frames per 5 seconds, three frames targeted to receiver C can be transmitted in three consecutive time slots. However, two time slots are wasted, as shown.

Finally, when the second burst targeted to receiver A is transmitted, four times slots per frame are again wasted.

FIG. 3C shows, by contrast, the transmission of sequence 300 with rate control according to embodiments of the invention. Assume that sequence 300 has been queued in frame buffer 206. Again, oldest frames are transmitted first. Thus, frame $A_1$ is transmitted first as before, but it is then determined that transmitting frame $A_2$ in the next consecutive time slot would exceed the data reception rate capability of receiver A. Thus, queue 208 in frame buffer 206 is searched for a frame that can be transmitted in the next consecutive time slot without exceeding the data reception rate capability of its target receiver. In this example, $B_1$ is the next frame in queue 208 that can be transmitted in the next consecutive time slot without exceeding the data reception rate capability of its target receiver. Accordingly, frame $B_1$ is transmitted in the time slot consecutive to $A_1$'s time slot, with no need for intervening idle time slots. Similarly, frame $B_2$ can be transmitted in the time slot consecutive to $B_1$'s time slot without exceeding the data reception rate capability of receiver B.

However, because the data reception rate capability of receiver B is only 2 frames per 5 seconds, it is next determined that frame $B_3$ cannot be transmitted in the time slot consecutive to frame $B_2$'s time slot. Thus, queue 208 in frame buffer 206 is searched for a frame that can be transmitted in the next consecutive time slot without exceeding the data reception rate capability of its target receiver.

Accordingly, frame C, is then selected for transmission. Frame $C_1$ is transmitted in the time slot consecutive to frame $B_2$'s time slot, with no need for intervening idle slots. Similarly, frame $C_2$ can be sent in the time slot consecutive to frame $C_1$'s time slot.

Next, because four time slots have elapsed since frame $A_1$ was transmitted, frame $A_2$, the oldest frame in queue 208, can now be transmitted, in the time slot consecutive to $C_2$'s time slot. Frame $A_3$ cannot be transmitted next, however, so frames $B_3$, $B_4$, $C_3$ and $C_4$ are transmitted in the four consecutive time slots following frame $A_2$'s time slot, by making the same determinations as described above in connection with frames $B_1$, $B_2$, $C_1$ and $C_2$.

Next, because four time slots have elapsed since frame $A_2$ was transmitted, frame $A_3$ can now be transmitted, in the time slot consecutive to $C_4$'s time slot. Frames $B_5$ and $C_5$ are then transmitted in the next two consecutive time slots.

Finally, frames $A_4$, $A_5$ and $A_6$ are transmitted. In this particular example, a non-refreshed queue has been discussed, and therefore idle time slots occur between the time slots for frame $C_5$ and $A_4$, and the time slots for frames $A_5$ and $A_6$. In practice, new data frames would be continually fed to frame buffer 206 and added to queue 208, and such idle slots would not occur in significant numbers.

Figure 4:
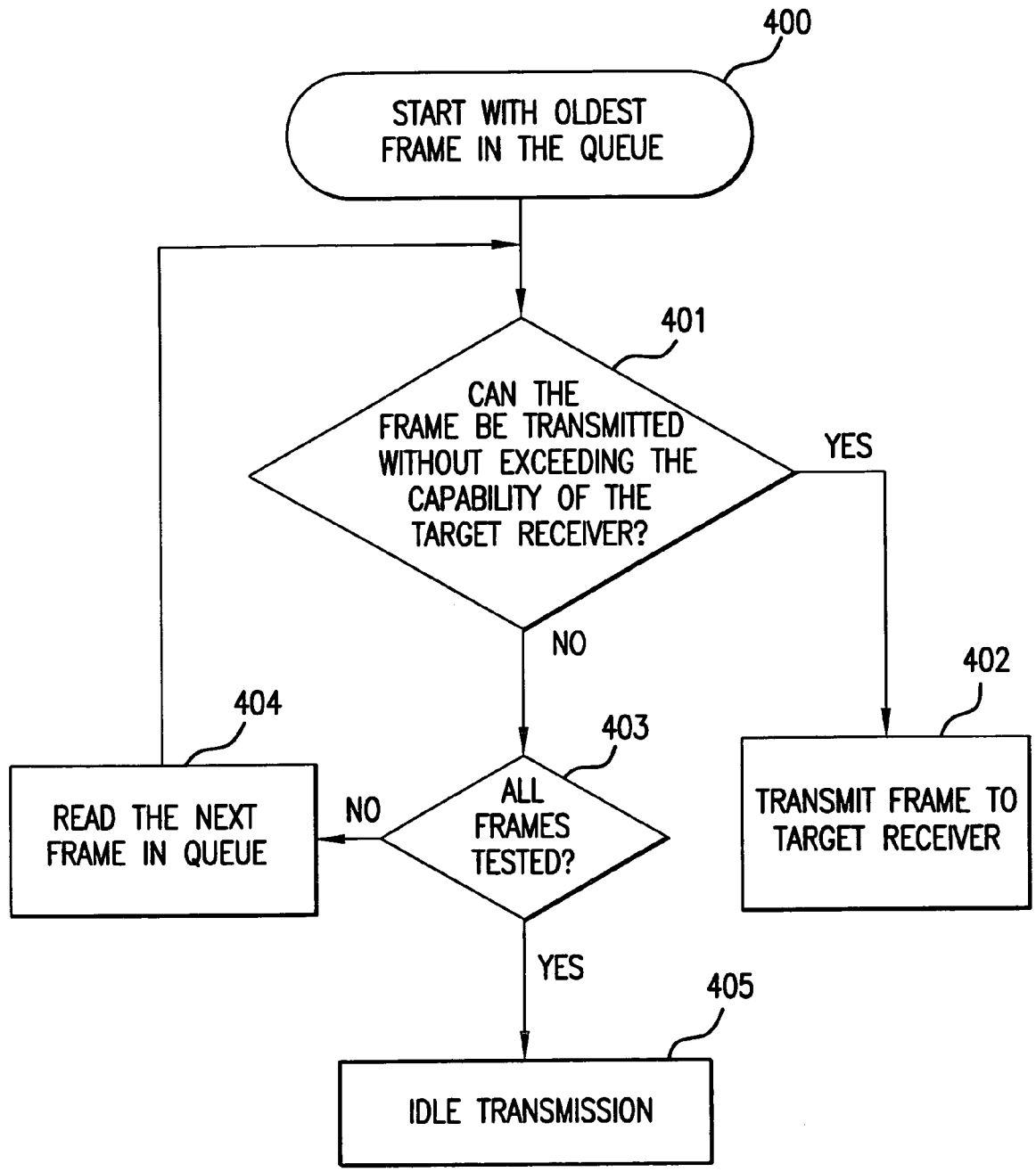
FIG. 4 is a flowchart illustrating rate control according to an embodiment of the invention.

FIG. 4 shows the foregoing process in flowchart form. The flowchart shows the process on a per-time slot basis; i.e., the process determines, for a given time slot, whether a frame can be transmitted or whether the time slot must be idled.

As shown in ellipse 400, the process starts with the oldest frame in queue 208. As shown in block 401, it is determined whether the frame can be transmitted to its target receiver in the next consecutive time slot of the channel resource slots without exceeding the data reception rate capability of the target receiver. In order to implement this step, according to one embodiment, the data reception rate capability of the target receiver could be included in the frame header. Alternatively, the data reception rate capability of each receiver in the network could be included in a look-up table accessible to frame selector 207. After determining the data reception rate capability of the target receiver, frame selector 207 could compare it with a running tally of how many frames had been transmitted to the target receiver within the past N consecutive time slots, where N was some suitably-chosen, user-dependent number.

If the data reception rate capability of the target receiver was not exceeded, the frame could be transmitted to the target receiver, as shown in block 402.

If the data reception rate capability of the target receiver was exceeded, however, the frame could not be transmitted to the target receiver. Thus, a check could be performed to determine whether all the frames in queue 208 had been tested for whether they could be transmitted in the next consecutive time slot, as shown in block 403. If not, the next frame in queue 208 could be read and tested, as shown in block 404.

On the other hand, if all queued frames had been tested and none could be transmitted in the next consecutive time slot without exceeding the data reception rate capability of its target receiver, transmission of data could be idled for that time slot, as shown in block 405.

As noted above, frame selector 207 may be implemented in computer-executable instructions, which when executed by a processor carry out the advantageous features of the invention. The computer-executable instructions could be tangibly embodied in computer-usable media such as diskettes, magnetic tapes, CD-ROMs, RAM, ROM, FPGAs (Field Programmable Gate Arrays) or ASICs (Application Specific Integrated Circuits).

What has been described is merely illustrative of the application of the principles of the present invention. Other arrangements and methods can be implemented by those skilled in the art without departing from the spirit and scope of the present invention.

What is claimed is:

1. A method for transmitting information to a plurality of receivers having respective different data reception rate capabilities, comprising:

receiving data frames targeted to respective receivers from an information source;

maintaining a queue of said data frames;

identifying a data reception rate capability of a target receiver of a queued data frame;

maintaining a count of frames transmitted to the target receiver;

comparing the data reception rate capability with the count;

based on the comparing, if the data reception rate capability of said target receiver is not exceeded by transmitting said queued data frame within a next consecutive channel resource slot, transmitting said queued data frame to said target receiver; and otherwise, searching said queue for a data frame which can be transmitted in said next consecutive channel resource slot without exceeding the data reception rate capability of its target receiver.

2. The method of claim 1, further comprising:

if no data frame can be found in said queue which can be transmitted in said next consecutive channel resource slot without exceeding the data reception rate capability of its target receiver, idling transmission of said data frames.

3. The method of claim 1, wherein said data reception rate capability is specified in a header of said frame.

4. The method of claim 1, wherein said data reception rate capability is specified in a look-up table.

5. The method of claim 1, wherein said predetermined data reception rate capability is set based on a service agreement.

6. A transmitter for use in a communication network, comprising:

a rate controller comprising a data frame buffer and a frame selector, wherein said data frame buffer stores data frames received from an information source of said communication network, said data frames being targeted to a plurality of receivers with respective different data reception rate capabilities; and wherein said frame selector selects a data frame from said buffer for transmission to a target receiver based on a comparison of a count of transmitted frames with a data reception rate capability of said target receiver.

7. The transmitter of claim 6, wherein said data frame buffer further comprises a data frame queue for storing said data frames received from said information source.

8. The transmitter of claim 6, wherein said frame buffer is formatted as an array.

9. The transmitter of claim 6, wherein said frame buffer is formatted as a linked list.

10. The computer-readable medium tangibly embodying executable instructions, said instructions when executed implementing a process comprising:
   (i) searching a queue comprising a plurality of data frames targeted to a plurality of receivers with respective different data reception rate capabilities; and
   (ii) selecting a data frame from said queue for transmission to a target receiver based on a comparison of a count of transmitted frames with a data reception rate capability of said target receiver.

11. The computer-readable medium of claim 10, wherein (ii) comprises:
   identifying a data reception rate capability of a target receiver of a queued data frame;
   if said data reception rate capability of said target receiver is not exceeded by transmitting said queued data frame within a next consecutive channel resource slot, transmitting said queued data frame to said target receiver;
   otherwise, searching said queue for a data frame which can be transmitted in said next consecutive channel resource slot without exceeding the data reception rate capability of its target receiver.

12. The computer-readable medium of claim 10, wherein said data reception rate capability is specified in a header of said frame.

13. The computer-readable medium of claim 10, wherein said data reception rate capability is specified in a look-up table.

14. The computer-readable medium of claim 10, said process further comprising:
   if no data frame can be found in said queue which can be transmitted without exceeding the data reception rate capability of its target receiver, idling transmission of said data frames.

15. A rate controller for use in a transmitter, comprising:
   a data frame buffer; and
   a frame selector;
   wherein said data frame buffer stores data frames received from an information source, said data frames being targeted to at least one of a plurality of receivers with different data reception rate capabilities; and
   wherein said frame selector selects a data frame from said buffer for transmission to a target receiver based on a comparison of a count of transmitted frames with a data reception rate capability of said target receiver.

16. The rate controller of claim 15, wherein said data frame buffer further comprises a data frame queue.

* * * * *